Oct. 17, 1950   E. T. JOHNSON   2,526,028
POWER ACTUATING MEANS FOR DUMP RAKES AND THE LIKE
Original Filed Aug. 20, 1945
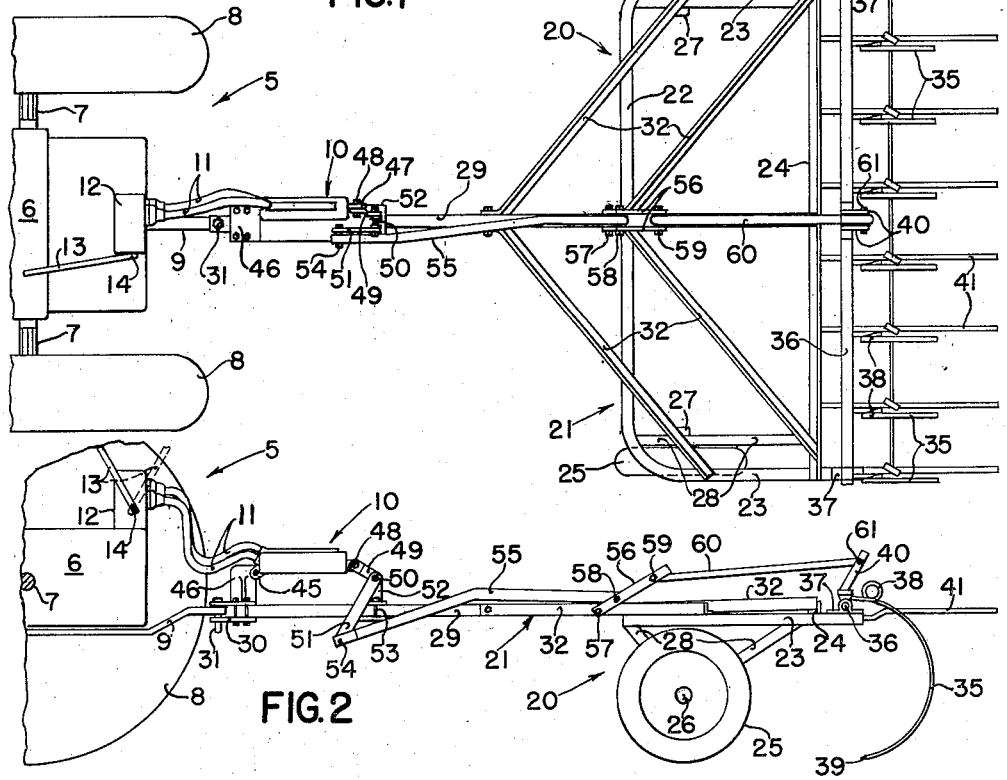
FIG. 1
FIG. 2
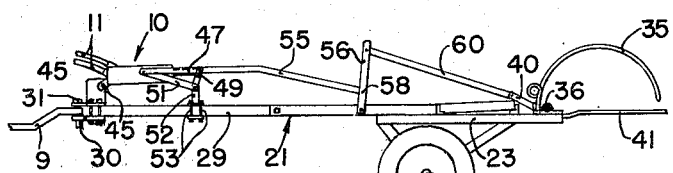
FIG. 3
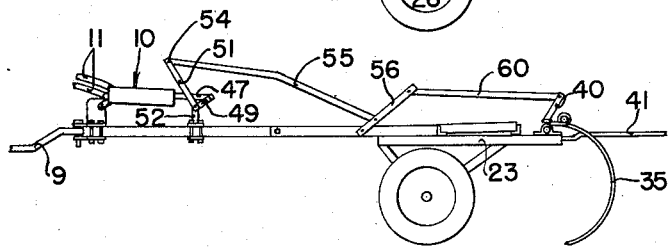
FIG. 4
INVENTOR.
ELLSWORTH T. JOHNSON
ATTORNEYS.

Patented Oct. 17, 1950

2,526,028

UNITED STATES PATENT OFFICE 2,526,028

POWER ACTUATING MEANS FOR DUMP RAKES AND THE LIKE

Ellsworth T. Johnson, Moline, Ill., assignor to Deere & Company, Moline, Ill., a corporation of Illinois Continuation of application Serial No. 611,469, August 20, 1945. This application January 3, 1950, Serial No. 136,547

4 Claims. (Cl. 56—27)

1

This application is a continuation of my copending application, Serial No. 611,469, filed August 20, 1945, now abandoned.

The present invention relates generally to agricultural implements and more particularly to implements of the type having a tool movable between two positions, such as a lowered operating position and a raised inactive position, and has for its principal object the provision of power actuated means for moving the tool between the two positions. In the case of certain implements, for example, dump rakes, damming devices, and the like, the tool is normally held in a lowered working position as the implement advances, until a load of crops or earth is collected by the tool, whereupon the tool is raised to release the accumulated load and immediately lowered to accumulate a new load. Heretofore, the raising and lowering of the tool has been accomplished by power received from a rotating member, such as a wheel in contact with the ground.

Attempts have been made to control the movements of the tool by control means receiving power from the tractor engine and both the tractor power take-off shaft and power lift have been used for this purpose. For example, see Patent 2,237,280, granted April 1, 1941, to Coultas and Colvin. Devices of this type have, however, been either too complicated in construction, or slow in operation, for it will be appreciated that a tool such as a dump rake must be quickly raised and lowered in order to gather all of the crops in the field.

A further object of my invention, therefore, relates to the provision of a power actuated means for a dump rake, or the like, which is simple and inexpensive to furnish, but which is fast in operation. In the accomplishment of this object, I have employed the conventional power lift cylinder of the type which can be mounted on the drawbar of the implement and connected with the control mechanism on the tractor by means of flexible hoses. However, it will be appreciated by those skilled in the art, that if this conventional type of cylinder is connected directly to a rake head by conventional means, it will require such a long period of time for the cylinder to raise the rake head by movement in one direction and to lower the rake head by movement in the opposite direction, that a considerable portion of the crops lying in the field will not be engaged and collected by the rake.

Therefore, a more specific object of my invention relates to the provision of a novel and

2 improved mechanism connecting the hydraulic cylinder with the rake head whereby a single stroke of the cylinder will quickly raise and immediately thereafter lower the rake head during the movement of the piston from one end of the cylinder to the other.

These and other objects and advantages of my invention will be apparent to those skilled in the art after a consideration of the following description, in which reference is had to the drawings appended hereto, in which Figure 1 is a top plan view of the rear end portion of a tractor and a dump rake connected thereto in trailing relation, and embodying the principles of the present invention;

Figure 2 is a side elevational view of the rear end portion of the tractor and the dump rake, the latter being shown in raking position;

Figure 3 is a side elevational view of the dump rake, showing the rake in raised position for dumping, and drawn to a smaller scale; and Figure 4 is a side elevational view similar to Figure 3 but showing the rake returned to its operating position at the end of the stroke of the hydraulic cylinder.

Referring now to the drawings, the tractor is indicated in its entirety by reference numeral 5 and comprises a central body portion 6 carried on a pair of laterally extending drive axles 7, the latter being supported on a pair of traction wheels 8. A drawbar 9 extends rearwardly from the tractor body 6 to which it is suitably connected. The tractor 5 is also provided with a conventional power lift mechanism including a fluid motor or hydraulic piston and cylinder assembly 10 connected by a pair of flexible hoses 11 to a control box 12 mounted on the rear end of the tractor body 6. A control lever 13 is pivotally mounted at 14 on the side of the control box 12 and is swingable from a vertical neutral position to a forwardly inclined position shown in solid lines, to control the flow of fluid through the hoses 11 to the cylinder 10 to force the piston (not shown) toward the forward end of the cylinder. By swinging the control lever 13 to a rearwardly inclined position, indicated by dotted lines in Figure 2, the flow of fluid through the hoses 11 can be controlled to force the piston (not shown) toward the rear end of the cylinder. The piston can be stopped at any position in the cylinder 10 by returning the control lever 13 to the vertical neutral position, which locks the piston in the cylinder. The hydraulic mechanism described herein is a conventional double acting device, so called because fluid can be forced into the cylinder at either end of the latter, selectively, and, therefore, has a cycle of operation including two distinct phases: extension and retraction. It is shown diagrammatically and described only briefly, in view of the fact that it is a type well known to those skilled in the art.

The dump rake, representing one form of tool to which the invention is applicable, is indicated by reference numeral 20 and comprises a generally horizontally disposed frame 21 including a main transversely disposed frame member 22, the ends of which turn rearwardly along opposite sides of the rake, as indicated at 23, and are interconnected at their rear ends by a transverse frame member 24. A pair of ground engaging supporting wheels 25 are journaled on stub axles 26, which are supported on hubs 27 rigidly mounted on downwardly converging leg structure 28, the latter being fixed to the front and rear transverse frame members 22, 24. A rigid draft tongue 29 is fixed to the transverse frame members 22, 24 and extends forwardly therefrom and is provided at its forward end with a coupling device 30 which is provided with a coupling pin 31 for swingably connecting the forward end of the tongue 29 to the drawbar 9 of the tractor. The frame is braced to the tongue 29 by means of a plurality of rearwardly and outwardly inclined bracing members 32.

A tool or implement part is provided by a plurality of laterally spaced semi-circularly curved raking teeth 35 that are rigidly secured in laterally spaced relation to a transversely disposed rake head in the form of a tubular beam 36, which is journaled in a pair of laterally spaced bearings 37 mounted on the rear end of the rearwardly extending legs 23 of the frame member 22, respectively. Each of the teeth is provided with a coil 38 to provide resiliency in the teeth 35, the latter curving rearwardly and downwardly and then forwardly to raking points 39, which engage the ground and slide under the crops lying thereon. The bearings 37 provide means for mounting the rake head 36, together with the teeth 35, on the frame for swinging relative to the frame about the transverse axis of the rake head 36, through a complete operating cycle including movement from a raking or ground-proximate position, as shown in Figure 2, to a raised inactive or transport position as shown in Figure 3. The rake is actuated through a lever arm 40, rigidly attached to the tubular beam 36. Stripper rods 41 extend rearwardly from the transverse frame member 24, to which they are secured in a well known manner.

The cylinder of the hydraulic piston and cylinder assembly 10 is pivotally connected at 45 to a bracket 46 rigidly mounted on the forward end of the draft tongue 29 of the implement 20. The hydraulic device includes a movable element in the form of a piston rod or equivalent reciprocating part 47, which is connected by a transverse pivot bolt 48 to one arm or element 49 of a bell crank that includes a supporting shaft portion 50 and a second arm or member 51 which is longer than the arm 49. The transverse supporting portion 50 of the bell crank is rockable on or journaled in a bracket 52, which is rigidly secured by bolts 53 to the draft tongue 29. The longer arm 51 of the bell crank has a first end portion rockably carried by the means 50 on the frame and an outer or second end portion or element that is pivotally connected by a bolt 54 to a rearwardly extending link 55. A lever arm 56 is pivotally mounted at 57 on the draft tongue to swing fore and aft in a generally longitudinally extending vertical plane. The rear end of the link 55 is pivotally connected at 58 to the lever arm 56. The outer end of the lever arm 56 is connected by a pivot bolt 59 to a rearwardly extending link 60, which is connected by a transverse pivot 61 to the actuating arm 40 of the rake. The linkage 55 and 60 and lever arm 56 constitute proportionating mechanism for proportioning the travel of the arm 51 and tool 35.

The operation of the dump rake is as follows: Figure 2 shows that when the rake or tool 35 is in lowered or ground-proximate position to effect the raking of hay, the arm 51 is in a first position spaced a predetermined distance from the tool-mounting means; that is, the point 54 of the arm 51 is in a first or starting position at the beginning of its movement through a defined arcuate path about the pivot 50. When the rake has accumulated a sufficient load of hay or other crop material, the operator swings the control lever 13 rearwardly to the position shown in dotted lines, causing fluid to be forced under pressure into the forward end of the cylinder and thus forcing the piston rod 47 rearwardly, or through one phase of its two-phase cycle, thereby swinging the bell crank arms 49, 51 in a clockwise direction. During the first half of the first-phase stroke of the piston rod 47 the arm 51 of the bell crank moves upwardly through its arcuate path to a second or intermediate center position as shown in Figure 3; thus, the distance between the point 54 and the tool mounting means is increased over the distance shown in Figure 2. Hence, this movement of the arm 51 pulls the link 55 forwardly from the position shown in Figure 2 to that shown in Figure 3, transmitting force through the link 55 to swing the lever arm 56 in a counterclockwise direction to a substantially vertical position, as shown in Figure 3, thereby pulling forwardly on the link 60 and rotating the rake in a counterclockwise direction from the lowered operating position in engagement with the ground to a raised inactive position, as shown in Figure 3, in which the rake teeth are raised upwardly above the stripper rods 41, completing one-half the operating cycle of the rake. This releases the accumulated load from the teeth 35 and deposits it in a windrow on the ground. The piston rod 47 continues on its rearward stroke, however, in its first phase, and, through the arm or element 49, effects swinging of the longer arm 51 still in a clockwise direction to move the point 54 at the outer end of the arm 51 farther along its arcuate path to a third position as shown in Figure 4. It will be seen that the first and third positions of the point 54 (Figs. 2 and 4 respectively) are spaced equidistantly from the tool-mounting means and that the distance between the tool-mounting means and the point 54 when in its center position as shown in Figure 3 is considerably greater than the aforesaid equidistant spacing. In short, the position of the arm 51 in Figure 3 is a center position and each of the positions of the arm 51 in Figure 2 or 4 is an overcenter position. Hence, movement of the arm 51 from its center position (Figure 3) to its one overcenter position (Figure 4) results in shifting of the link 55 rearwardly to thereby swing the lever arm 56 rearwardly and acting through the link 60 and arm 40 to swing the rake teeth 35 downwardly once again. When the piston rod 47 reaches the end of its range of travel in first-phase movement, and with the hydraulic piston and cylinder assembly 10 in extended position, as shown in Figure 4, the rake teeth are in ground engaging position exactly as they were in Figure 2, by virtue of the fact that the angle through which the crank arm 51 moves above the horizontal is substantially equal to the angle between its initial position (Fig. 2) and the horizontal position. In other words, operation of the fluid motor through one-half of its cycle effects full-cycle operation of the rake head. Hence, it is evident that a single stroke of the piston rod 47 from retracted position to extended position causes the rake teeth 35 to be raised from working position to operating position and returned again to working position. To accomplish this movement, the operator swings the control lever 13 rearwardly to the position shown in dotted lines.

The rake continues to accumulate crop material until the operator decides to dump the rake again, whereupon he merely shifts the control lever 13 forwardly to the position shown in solid lines in Figure 2, thereby causing the piston and cylinder assembly 10 to move in its second phase or to retract to its collapsed position. This causes the bell crank arms 49, 51 to swing in a counterclockwise direction so that the point 54 moves reversely through its arcuate path; and during the first half of the movement of the piston rod 47 the arm 51 swings downwardly toward the horizontal or center position shown in Figure 3, thereby raising the rake teeth 35 to the dumping position, and as the arm 51 continues downwardly to its original overcenter position, as shown in Figure 2, the rake teeth 35 are once more lowered to the working position. Inasmuch as the rake teeth 35 move through a complete cycle up and down responsive to a single continuous movement of the piston and cylinder assembly 10 between retracted and extended position, or vice versa, the movement of the rake head is fast enough so that the lower ends 39 of the teeth 35 are returned to ground-engaging position immediately beyond the windrow thus formed, with the result that all of the crops lying on the ground are gathered into windrows.

Obviously, the principles of this invention are not intended to be limited to the dump rake operation, but can also be applied to scrapers for moving earth, damming devices, or the like.

I claim:

1. In an agricultural implement having a mobile frame adapted to travel over the ground, a tool, and means mounting the tool on and for movement relative to the frame from a lowered, ground-proximate position to a raised position and return, the improvement comprising: an actuating arm having first and second end portions and including means at the first end portion for the mounting of the arm on the frame for swinging of the second end portion through an arcuate path including a center position spaced a predetermined distance from the tool-mounting means, and a pair of over-center positions, one at each side of the center position, equidistantly spaced from the tool-mounting means a distance different from said predetermined distance; means for interconnecting said second arm portion and the tool so that the tool is in its lowered position when said arm portion is in either of its over-center positions and is in its raised position when said arm portion is in its center position; and means attachable to the frame for moving said arm portion, including a reciprocating element connected to the arm and movable alternately in a first stroke in one direction and a return stroke in the opposite direction for moving said arm portion alternately in opposite directions from one over-center position to the other and through said center position, whereby either stroke of said element first raises and then lowers the tool.

2. In an agricultural implement having a mobile frame adapted to travel over the ground, a tool, and means mounting the tool on and for movement relative to the frame from a lowered, ground-proximate position to a raised position and return, the improvement comprising: an actuating member having means for the mounting thereof on the frame for movement successively through first, second and third positions and return; means associated with the actuating member and defining a path for the movement of said member through said positions so that said first and third positions lie respectively at opposite sides of said second position and are equidistantly spaced from the tool-mounting means and so that said second position is spaced from the tool-mounting means a distance different from that of said spacing of the first and second positions from the tool-mounting means; means for interconnecting said member and the tool so that the tool is in its lowered position when said member is in either its first or third position and is in raised position when said member is in its second position; and means attachable to the frame for moving said element through said path, including a reciprocating element connected to said element and having alternate strokes respectively in opposite directions for moving said member alternately in opposite directions from first to third position or third to first position and each time through said second position, whereby either stroke of said element effects raising and then lowering of the tool.

3. The invention defined in claim 1, further characterized in that: the means for moving said member comprises an extendible and retractible, fluid-pressure cylinder and piston assembly having a moving part arranged for alternate extension and retraction in strokes of equal length and opposite direction; and said element is operatively connected to said moving part.

4. The invention defined in claim 1, further characterized in that: the means for interconnecting the member and tool includes proportionating mechanism for proportioning the travel of the element to the travel of the tool.

ELLSWORTH T. JOHNSON.

No references cited.